United States Patent
Herold (10) Patent No.: US 10,267,381 B2
(45) Date of Patent: Apr. 23, 2019

(54) METHOD FOR ATTACHING A CONNECTOR ELEMENT TO A BELT END OF A CONVEYOR BELT

(71) Applicant: MATO GmbH & Co. KG, Muehlheim am Main (DE)

(72) Inventor: Wolfgang Herold, Offenbach (DE)

(73) Assignee: MATO GMBH & CO. KG, Mühlheim am Main (DE)

( * ) Notice: Subject to any disclaimer, the term of this patent is extended or adjusted under 35 U.S.C. 154(b) by 0 days.

(21) Appl. No.: 15/933,917

(22) Filed: Mar. 23, 2018

(65) Prior Publication Data

US 2018/0283494 A1 Oct. 4, 2018

(30) Foreign Application Priority Data

Mar. 31, 2017 (EP) ..................................... 17164157

(51) Int. Cl.
*F16G 3/04* (2006.01)
*B29D 29/06* (2006.01)
(Continued)

(52) U.S. Cl.
CPC ............... *F16G 3/04* (2013.01); *B29D 29/06* (2013.01); *B65G 15/32* (2013.01); *F16G 3/003* (2013.01);
(Continued)

(58) Field of Classification Search
CPC .......... B65G 15/30; B65G 15/32; F16G 3/00; F16G 3/003; F16G 3/006; F16G 3/02;
(Continued)

(56) References Cited

U.S. PATENT DOCUMENTS 5,531,316 A * 7/1996 Savino ................ B29C 65/5057
198/844.2
6,896,124 B2 * 5/2005 Herold ...................... F16G 3/04
198/844.2
(Continued)

FOREIGN PATENT DOCUMENTS

EP 2101080 A2 9/2009
WO 2010121360 A1 10/2010

OTHER PUBLICATIONS

European Patent Office (EPO), Europäischer Recherchenbericht (European Search Report), dated Nov. 16, 2017 (dated Nov. 16, 2017), 7 pages, EPO Munchen, Germany.

*Primary Examiner* — Gene O Crawford
*Assistant Examiner* — Keith R Campbell
(74) *Attorney, Agent, or Firm* — Christopher C. Dremann, P.C.; Christopher C. Dremann (57) ABSTRACT

A method for attaching a connector element to a belt end of a conveyor belt, wherein the connector element has a base tier provided with central passages and an adhesive tier disposed on one side of the base tier that produces adhesive under the effect of heat, including (i) disposing the connector element on the belt end of the conveyor belt positioned in a U-shaped deflection that is disposed on averted sides of the belt and on one end side of the belt with the passages positioned in the region of the U-shaped deflection and the adhesive tier disposed so as to face the averted sides of the belt; and (ii) connecting the connector element to the averted sides of the belt, wherein the connector element is adhesively bonded to the belt under the effect of a heated pressing installation on both sides of the belt.

20 Claims, 8 Drawing Sheets

(51) Int. Cl.
  *B65G 15/32*  (2006.01)
  *F16G 3/00*  (2006.01)
  *F16G 3/02*  (2006.01)
  *F16G 3/10*  (2006.01)
  *F16G 3/16*  (2006.01)

(52) U.S. Cl.
  CPC ................ *F16G 3/02* (2013.01); *F16G 3/10* (2013.01); *F16G 3/16* (2013.01)

(58) Field of Classification Search
  CPC ..... F16G 3/04; F16G 3/10; F16G 3/16; Y10T 24/16; Y10T 24/1608; Y10T 24/1612; Y10T 24/162; Y10T 24/1632; Y10T 24/1636; Y10T 24/164; Y10T 24/1664; Y10T 24/1688; Y10T 24/1696; B29D 29/06
  USPC ............... 198/844.2; 474/253, 254, 255, 256
  See application file for complete search history.

(56) References Cited

U.S. PATENT DOCUMENTS

| | | | |
|---|---|---|---|
| 8,945,320 B2* | 2/2015 | Herold | F16G 3/003 |
| | | | 156/298 |
| 9,297,440 B2* | 3/2016 | Manninen | B29C 66/729 |
| 9,334,606 B2* | 5/2016 | Manninen | D21F 7/10 |
| 9,457,539 B2* | 10/2016 | Manninen | F16G 3/02 |
| 9,598,814 B2* | 3/2017 | Manninen | D06H 5/00 |
| 2003/0150698 A1 | 8/2003 | Herold | |
| 2011/0100896 A1 | 5/2011 | Herold | |
| 2016/0160435 A1 | 6/2016 | Manninen | |

* cited by examiner

METHOD FOR ATTACHING A CONNECTOR ELEMENT TO A BELT END OF A CONVEYOR BELT

CROSS REFERENCE TO RELATED APPLICATION

This United States non-provisional utility patent application claims the benefit of priority to European Patent Application No. 17 164 157.4 filed on Mar. 31, 2017, the entire disclosure of which is incorporated herein by reference.

FIELD OF THE INVENTION

The present invention relates to a method for attaching a connector element to a belt end of a conveyor belt.

BACKGROUND OF THE INVENTION AND RELATED ART

Connector elements are attached to belt ends of a conveyor belt so as to then establish an overlapping connection by way of said connector elements such that the latter can be coupled by means of a rod that penetrates the connector elements. The belt ends of the conveyor belt are interconnected on account thereof.

Connector elements can be of various designs. Connector elements which are connected directly to the conveyor belt by adhesive bonding are known, on the one hand. Connector elements, disposed in a U-shaped manner, are connected to the conveyor belt on averted sides of the conveyor belt. These connector elements are composed in particular of plastics.

Other known connector elements are composed of metal. Said connector elements are configured as wire hooks, for example, which are interconnected by means of a transverse wire. These wire hooks, in the case of an initial position that is opened in a U-shaped manner, are positioned relative to the belt end, and the two legs of the respective wire hook are then positioned on top of one another, wherein hook tips that are located at the end of the legs penetrate the belt when said hook tips are closed by bending.

A non-metallic connector element is described in PCT Application Publication No. WO 2010/121360 A1. A metallic connector element, and a method for attaching the latter to the belt, is known from European Patent Application No. EP 2 101 080 A2.

OBJECT AND SUMMARY OF THE INVENTION

It is an object of the present invention to specify a method for attaching a connector element to a belt end of a conveyor belt, which by way of a simple design of the connector element enables a reliable and time-saving attachment. This object is achieved by a method which has the features according to the invention as shown and described herein.

It is provided in the case of the method for attaching the connector element to the belt end of the conveyor belt that the connector element has a base tier and an adhesive tier which is disposed on one side of the base tier and produces adhesive under the effect of heat. The base tier in a central region is provided with passages. The connector element is disposed on the belt end in order for the connector element to be attached to the belt end of the conveyor belt. The connector element is positioned in a U-shaped manner, so as to be disposed on averted sides of the belt and on one end side of the belt. The passages are positioned in the region of the U-shaped deflection of the connector element, and the adhesive tier is disposed on the belt so as to face the averted sides of said belt. Connecting the connector element to the belt in the region of the averted sides of the belt is performed subsequently. The connector element is adhesively bonded to the belt under the effect of a heated pressing installation that is disposed on both sides of the belt.

It is thus possible to proceed from a plate-shaped connector element which, proceeding from a planar design, is bent to the U-shaped cross-sectional shape.

The aforementioned term "U-shaped" is to be understood to be both an arrangement of the two legs of the U in which said legs are disposed so as to be mutually generally parallel, as well as such an arrangement in which the two legs, proceeding from the web that connects the two legs, diverge, such as is most typically the case prior to the connector element being connected to the belt.

The connector element is then positioned such that the belt end of the conveyor belt can be positioned in a defined manner in relation to the connector element. The positioning of the belt end is performed in that central region of the base tier that is provided with the passages. These passages which are located in the region of the U-shaped deflection of the connector element represent that region of the connector element in which the overlapping arrangement in relation to the connector element that is attached to the other belt end of the conveyor belt can be established, for the purpose of subsequently plug-fitting a rod through the two connector elements in the overlapping regions of the latter.

It is considered as particularly advantageous when not only a heated pressing installation for adhesively bonding the connector element to the belt is provided, but it is additionally provided that the connection of the connector element to the belt is post-pressed by means of a cooled pressing installation that is disposed on both sides of the belt. This post-pressing under cooling has the advantage that a solid connection between the connector elements and the belt is guaranteed within a short time period. When working with only a heated pressing installation, it cannot be excluded that the adhesive connection between the connector element and the belt is not yet solid but slightly pasty such that there is a risk of an undesirable displacement of the connector element and of the belt.

It is considered particularly advantageous when the belt, in particular in the region of the belt end, in the case of a positioned connector element is secured so as to be locationally fixed in relation to the connector element, in particular is secured in such a manner until the post-pressing is completed. It is thus not only the connector element but also the belt that is secured during the attachment of the connector element to the belt end of the conveyor belt. As a result it is guaranteed that the connector element and the belt cannot be mutually displaced when the adhesive connection is not yet completely solid. This can be of particular significance when the belt and the connector element have to be repositioned from the heated pressing installation to the cooled pressing installation. It is considered advantageous when no such repositioning of the belt and of the connector element is required, but the belt and the connector element instead remain stationary, it being at best necessary for the pressing installation to be repositioned in a relative manner.

In principle, the same pressing installation can be embodied in such a manner that said pressing installation can be used for heating as well as for cooling. However, it is considered advantageous for the pressing installations to be mutually independent such that the heated pressing installation is disposed at one location, and the cooled pressing installation is disposed at another location.

The adhesive tier is preferably a layer of a hot-melt adhesive that is applied to the base tier. This is preferably a thermoplastic adhesive. The adhesive tier is in particular an applied polyurethane layer.

The heated pressing installation for connecting the connector element to the belt preferably acts on the connector element at a temperature of up to 180° C. and over a time period of 6 to 8 seconds.

The cooled pressing installation preferably post-presses the connection over a time period of 1 to 2 seconds.

Active heating is thus performed in the case of the heated pressing installation, while active cooling is performed in the case of the cooled pressing installation. The latter is thus particularly significant because the cooled pressing installation is usually disposed so as to be directly adjacent to the heated pressing installation and is thus subjected to indirect heating by way of the heat-pressing installation even when insulation measures have been carried out.

The heated pressing installation preferably does not act on the connector element in the region of the U-shaped deflection of the connector element. This U-shaped deflection is thus not actively heated such that any negative effect of the heating on this deflection is excluded, it being in particular prevented that the deflection region of the connector element becomes unnecessarily soft in the heating of the connector element. The heating by means of the heated pressing installation thus serves the purpose of heating the adhesive tier outside the U-shaped deflection, while simultaneously heating that region of the base tier to which the adhesive tier is applied, so as to enable the adhesive actions of the adhesive tier.

The adhesive tier is preferably entirely applied to the base tier. The connector element thus has the adhesive tier also in the region of the U-shaped deflection, said adhesive tier contributing to the overall strength of the connector element. If the connector element is not heated in the region of the U-shaped deflection, there is also no activation of the adhesive tier therein. No adhesive bonding which is not also desired in this region can thus be performed therein, because the overlapping arrangement of the connector elements in the region of the U-shaped deflections of adjacent connector elements is relevant when plug-fitting a coupling rod.

It is considered particularly advantageous when the connector element, or the base tier, respectively, in the region of the passages, in the case of a U-shaped deflection of the connector element, is mounted in a positioning installation. The positioning of the connector element is performed by means of a positioning installation provided specifically therefor. The latter guarantees the exact positioning of the connector element. This is very advantageous in particular when the belt is also secured, as has been set forth above. In this case, an exact positioning of the connector element and of the belt is guaranteed during the connection of the connector element to the belt.

According to a preferred embodiment it is provided that the connector element between the passages forms U-shaped protrusions which in the manner of a comb are plug-fitted through openings in the positioning installation. A rod of the positioning installation is plug-fitted perpendicularly to the plug-fitting direction of the connector element, said rod engaging behind the U-shaped protrusions and securing the connector element counter to the plug-fitting direction of the protrusions. A simple and rapid positioning of the connector element in the positioning installation is guaranteed by this design.

It is considered particularly advantageous when the connector element that is connected to the belt is transferred in a positionally fixed manner from the heated pressing installation to the cooled pressing installation. In the case of a not yet cooled and not yet solid connection of the connector element to the belt it is thus possible for the belt and the connector element to be transferred from the heated pressing installation to the cooled pressing installation. The connector element and the belt thus maintain their mutual relative position. This is particularly important for the quality of the belt assembly because precise coupling of the belt ends by means of the rod that couples the latter is only possible when an exact alignment of the respective connector element in relation to the belt end is guaranteed, and the coupling rod consequently does not have to absorb any unnecessary additional forces.

It is provided in particular that the heated pressing installation and/or the cooled pressing installation are/is not locationally variable, and the positioning installation that mounts the connector element is locationally variable, in particular locationally variable in a linear manner. In the latter case, the positioning installation can thus be displaced in only a linear reciprocating manner. Alternatively, in the context of a kinematic reversal, it is provided that the positioning installation that mounts the connector element is not locationally variable, and the heated pressing installation and/or the cooled pressing installation are/is locationally variable, in particular locationally variable in a linear manner.

The belt end of the conveyor belt, or the conveyor belt, is preferably horizontally disposed when the connector element is being attached to the conveyor belt. This arrangement enables a particularly simple attachment of the connector element to the belt, and moreover a favorable dissipation of the heat of the heated pressing installation. The design enables the cooled pressing installation to be disposed horizontally beside the heated pressing installation such that any undesirable heat transmission from the heated pressing installation to the cooled pressing installation is largely avoided.

It is considered particularly advantageous when a metal-free connector element is attached to the belt end. This is particularly very advantageous when not only the connector element but also the belt is metal-free. Such a belt assembly is outstandingly suitable for conveying items which are equipped with a RFID chip, such that the conveyed items can be detected, in particular counted, without any negative influence by way of the belt assembly. This is of importance in the laundry industry, for example.

According to an advantageous embodiment of the invention, a reinforcement is provided in the region of the U-shaped deflection. In particular, a connector element which is reinforced in the region of the U-shaped deflection is attached to the belt end. The connector element in the region of the U-shaped deflection preferably has a tension member. The latter can be, for example, a tension member that is adhesively bonded to the base tier, or a tension member that is interwoven with the base tier. The reinforcement, or the tension member, respectively, is composed, for example, of carbon fiber, of a woven fabric, of felt, or of a combination of such materials.

The connector element is attached in particular to a polyurethane belt, to a cotton belt, to a felt belt, to a polyvinyl chloride belt, or to a belt from mixtures of the aforementioned materials. The belt can indeed also be a filter belt.

Further features of the invention will be readily apparent to those skilled in the art from the description of the drawing figures and the detailed description of exemplary embodiments provided herein, as well as the accompanying drawing figures themselves, wherein it is noted that all features and individual features are relevant to the invention.

BRIEF DESCRIPTION OF THE DRAWING FIGURES

The method according to the present invention is illustrated in the drawing figures by means of exemplary embodiments, without being limited thereto.

DETAILED DESCRIPTION OF EXEMPLARY EMBODIMENTS

Figure 1:
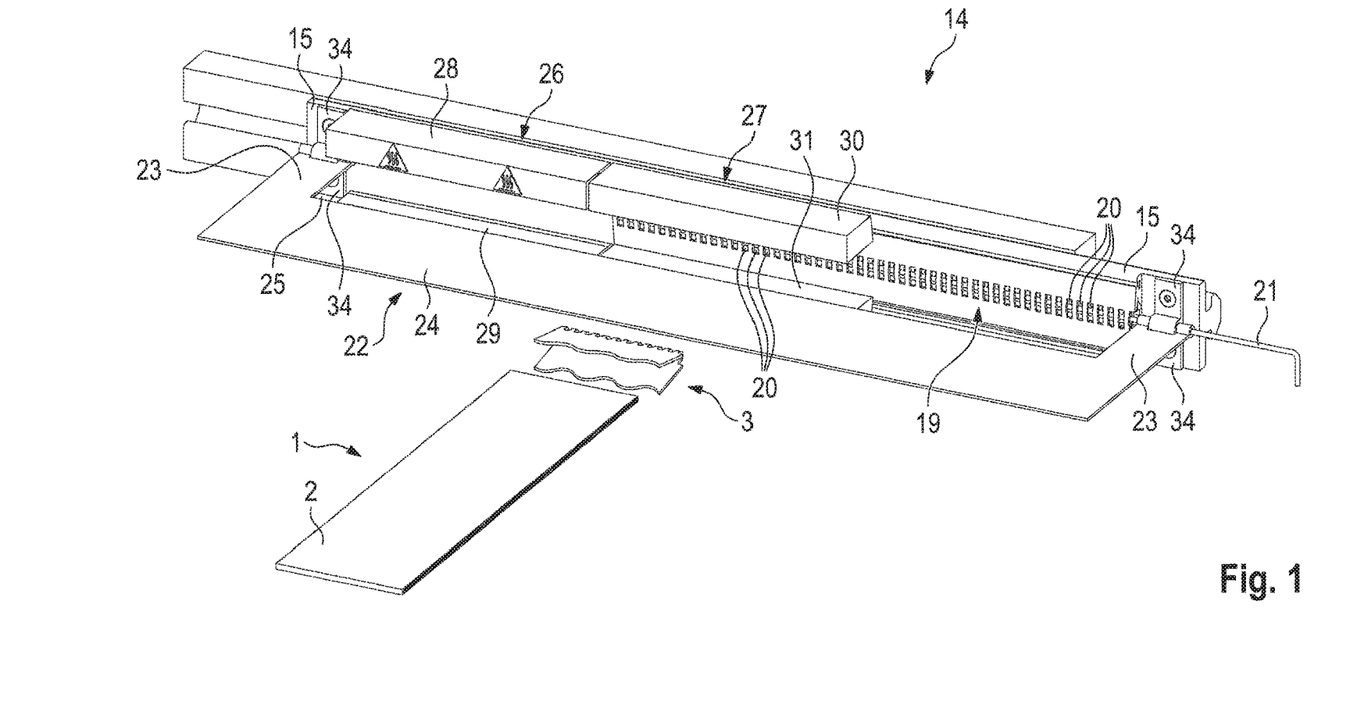
FIG. 1 shows a construction of a device for carrying out a method according to the present invention, illustrated in a heavily simplified manner, additionally illustrated having a belt end of a conveyor belt and a connector element that is provided for attachment to the belt end.

Reference in terms of the description of a conveyor belt 1 and of a connector element 3 that is to be attached, or is attached, respectively, to a belt end 2 of the conveyor belt 1 is first made to the illustration of FIG. 1 and of FIGS. 13 to 17.

A conveyor belt 1 in the region of a belt end 2, and a connector element 3 that is to be attached to the conveyor belt 1 in the region of the belt end 2 are shown in FIG. 1.

The conveyor belt 1 is, for example, a polyurethane belt, a polyvinyl chloride belt, a cotton belt, a felt belt, or a belt that is composed of mixtures of the aforementioned materials. The conveyor belt 1 can be used for various purposes, for example be configured as a filter belt.

Figure 15:
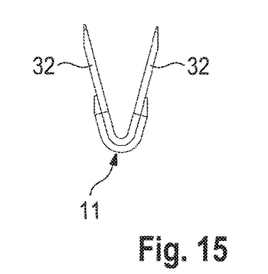
FIG. 15 shows the connector element in a view according to FIG. 13, albeit illustrated in a U-shaped, bent configuration.
Figure 16:
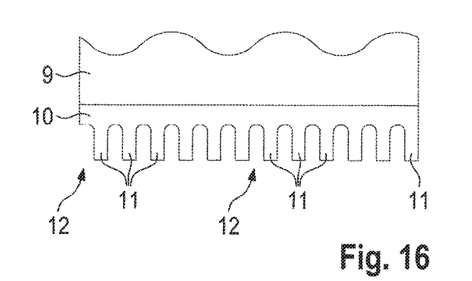
FIG. 16 shows said connector element in a plan view.

The connector element 3 has a base tier 4 and an adhesive tier 6 which is disposed on one side 5 of the base tier 4 and which produces adhesive under the effect of heat. The base tier 4 in a central region 7 is provided with passages 8. As can be derived in particular from the illustration of FIGS. 13 to 16, the base tier 4 is specifically formed by a lower woven fabric 9 and by an upper woven fabric 10 that is adhesively bonded to said lower woven fabric 9, wherein the upper woven fabric 10 is disposed in the central region 7 of the base tier 4. Both the lower woven fabric 9, as well as the upper woven fabric 10, penetrate the passages 8. The passages 8 are configured identically as slots that are disposed so as to be mutually parallel, such that webs 11 of the base tier 4 that are formed between said passages 8 form eyelets 12 when the connector element 3 is being bent back in a U-shaped manner, as is illustrated in FIGS. 15 and 16.

The adhesive tier 6 extends completely on the side 5 of the woven fabric 9. In the region in which the connector element 3 has the U-shaped deflection in the region of the eyelets 12, the upper woven fabric 10 represents a woven fabric that reinforces the connector element 3, thus counteracting the weakening of the lower woven fabric 9 by virtue of the various passages 8. The connector element 3 is composed of metal-free materials.

Figure 17:
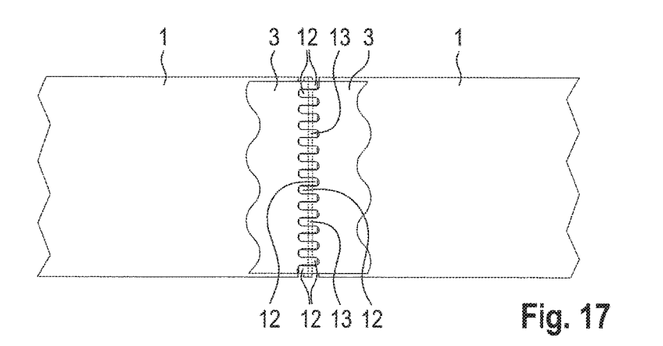
FIG. 17 shows a plan view of two facing belt ends of a conveyor belt, having the connector element attached to the respective belt end, in an overlapping position of the connector elements, and with the rod coupling the connector elements.

FIG. 17 shows two connector elements 3 that are connected to belt ends 2 of a conveyor belt 1, said connector elements 3 in the region of the eyelets 12 thereof being positioned in an overlapping arrangement. A coupling rod 13, the length thereof corresponding to the width of the conveyor belt 1, is plug-fitted through said eyelets 12 of the two connector elements 3. The rod 13 connects the conveyor belt 1 in the region of the two belt ends 2 of said conveyor belt 1.

The upper woven fabric 10, which in particular is assigned a reinforcing function for the connector element 3, is configured in particular as a tension member which in the case of the exemplary embodiments illustrated herein is adhesively bonded to the lower woven fabric 9. The tension member can indeed also be interwoven with the lower woven fabric 9. The tension member has carbon fiber components, for example.

Figure 2:
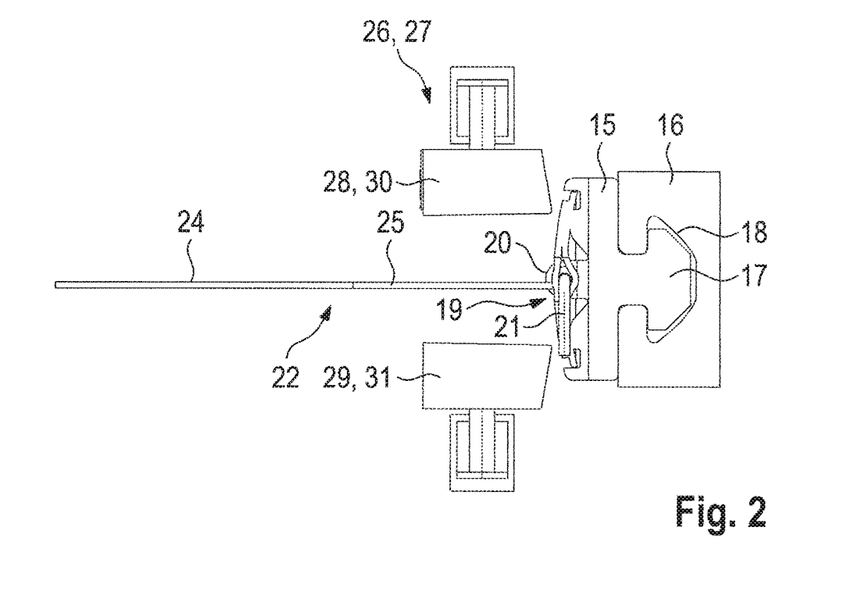
FIG. 2 shows the device according to FIG. 1 in a sectional view, sectioned perpendicular to the longitudinal extent of a rod in the region of a cooled pressing installation that is provided in the case of the device.

The attaching of a connector element 3 described above to a belt end 2 of a conveyor belt 1 is shown in FIGS. 1 to 12:

A device 14 for attaching the connector element 3 to the conveyor belt 1 is illustrated in the figures, wherein reference is made in particular to FIGS. 1 and 2. Said device 14 has a stationary support 15 and a rail 16 that is mounted so as to be displaceable to said support 15. The support 15 and the rail 16 herein are horizontally disposed, the rail 16 being horizontally displaceable. To this end, the support 15 has a protrusion 17 which engages in a guide groove 18 of the rail 16.

A positioning installation 19 is fixedly connected to the support 15. Said positioning installation 19 has passages 20 that are disposed horizontally beside one another and extend mainly in a vertical manner, said passages 20 being for plug-fitting therethrough the eyelets 12 of the connector element 3. Once the connector element 3 is plug-fitted through the passages 20, a fixing rod 21 is plug-fitted through the eyelets 12 such that the connector element 3 is held in the position thereof in the positioning installation 19.

A bearing plate 22 is mounted in the support 15 and as shown herein is slightly pivotable in relation to a horizontal plane. The bearing plate 22 is held in two lateral bearing receptacles 34 that are screw-fitted to the support 15. The bearing receptacles 34 also serve for receiving the fixing rod 21, the axis of the latter in the region of the positioning installation also representing the pivot axis of the bearing plate 22. The bearing plate 22 is configured so as to be U-shaped, having two legs 23 which at the end side are connected to the support 15, and having a web 24 that connects the legs 23. The bearing plate 22 thus encloses an opening 25. A heated pressing installation 26 and a cooled pressing installation 27 are disposed in the region of this opening 25. The two pressing installations 26, 27 are in each case mounted (in a manner not illustrated) in the rail 16 and by way of the latter are repositionable relative to the positioning installation 19. The heated pressing installation 26 has a press member 28 that is disposed above the bearing plate 22, and a press member 29 which is disposed below the bearing plate 22. Accordingly, the cooled pressing installation 27 has a press member 30 that is disposed above the bearing plate 22, and a press member 31 that is disposed below the bearing plate 22. The press members 28 and 29, or 30 and 31, respectively, are in each case repositionable in a vertical manner, that is to say that the upper press members 28 and 30, respectively, are capable of being lowered, and the lower press members 29 and 31, respectively, are capable of being lifted in order for the pressing to be thus carried out in the vertically converged pressing position, either in a manner heated by means of the heated pressing installation 26, or in a manner cooled by means of the cooled pressing installation 27, in the region of the passages 20 of the positioning installation 19.

FIGS. 1 and 2 show an initial method step for attaching the connector element 3 to the belt end 2 of the conveyor belt 1. The device 14 is shown having the rail 16 displaced to the left terminal position, the cooled pressing installation 27 thus being located approximately in the center of the opening 25 of the bearing plate 22, and the heated pressing installation 26 being located in the left region of the opening 25. The press members of the pressing installation are diverged, are thus located at the maximum above, or at the maximum below, respectively, the bearing plate 22. The belt end of the conveyor belt 1 and the connector element 3 which is to be connected to the conveyor belt 1 are also illustrated in FIG. 1.

Figure 3:
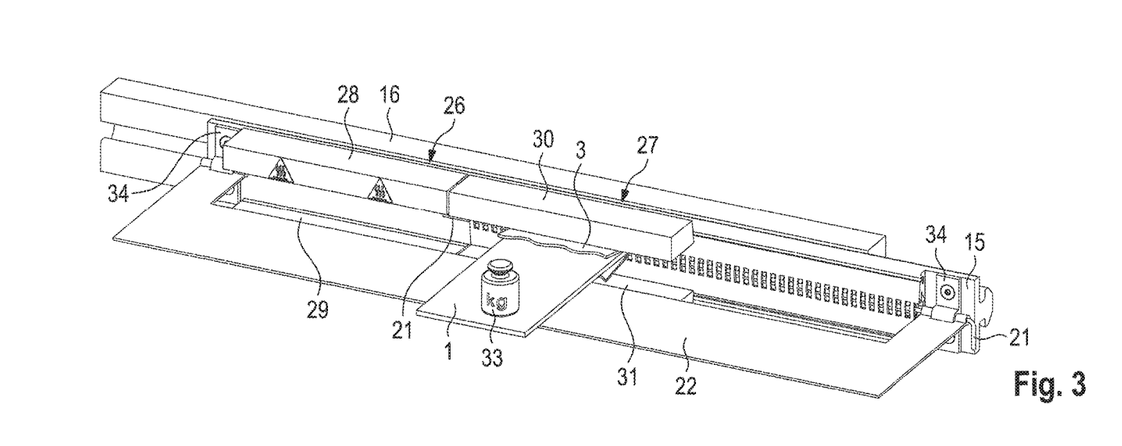
FIG. 3 shows the device according to FIG. 1, shown for a first method step for attaching the connector element to the belt end of the conveyor belt.
Figure 4:
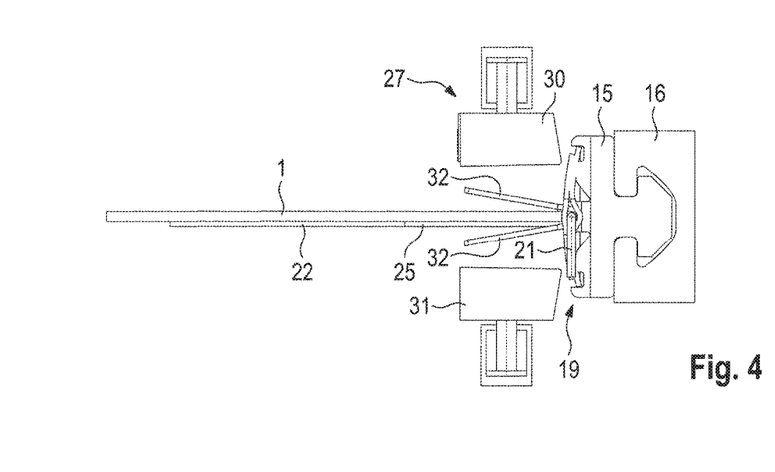
FIG. 4 shows the first method step, illustrated in a sectional view according to FIG. 2.

FIGS. 3 and 4 show the first method step in which the U-shaped bent connector element 3 in the region of the eyelets 12 thereof is plug-fitted through the passages 20 of the positioning installation 19 and is held by means of the fixing rod 21 that is mounted so as to be axially displaceable in the bearing plate 22, said fixing rod 21 penetrating the eyelets 12. Between the two legs 32 that adjoin the eyelets 12, the conveyor belt 1 in the region of the belt end 2 thereof is pushed in so far until the belt end 2 impacts the positioning installation 19 in the region of the passages 20. In this position that is exactly aligned in relation to the connector element 3, the conveyor belt 1 in the region of the belt end 2 thereof is held by way of a pressing installation (not illustrated in detail) which acts on the conveyor belt 1 and pushes the latter against the bearing plate 22. This pressing installation is illustrated in a simplified manner by a weight 33.

Figure 5:
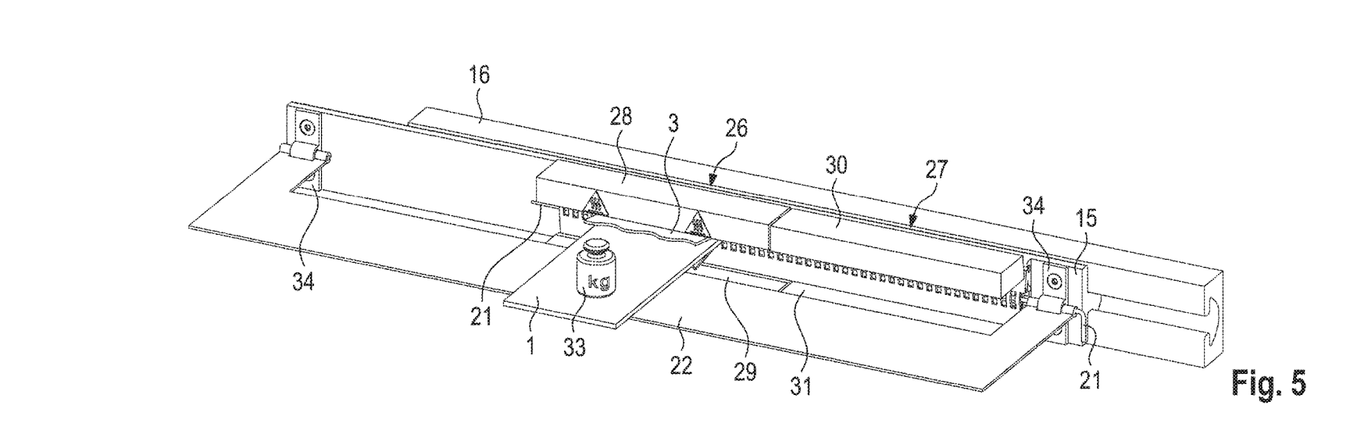
FIG. 5 shows the device according to FIG. 1, shown for a second method step for attaching the connector element to the belt end of the conveyor belt.
Figure 6:
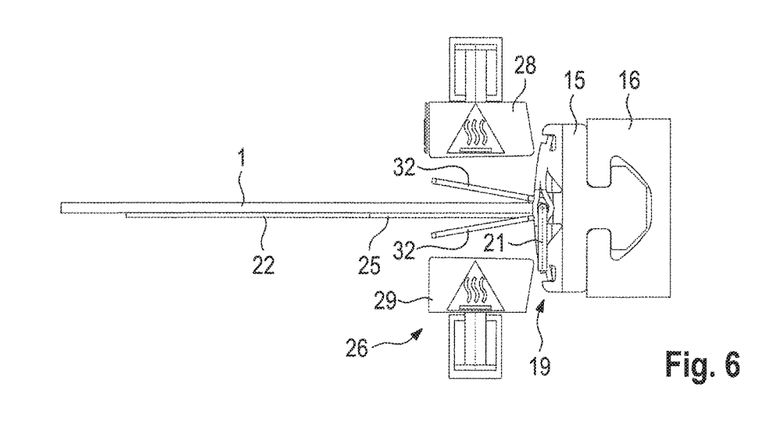
FIG. 6 shows the second method step, illustrated in a sectional view according to FIG. 2.

A second method step is illustrated in the context of FIGS. 5 and 6, wherein the rail 16 conjointly with the two pressing installations 26, 27 is subsequently repositioned horizontally to the right, such that the cooled pressing installation 27 is now disposed in the right region of the opening 25, and the heated pressing installation 26 is disposed in the central region of the opening 25, the connector element 3 thus being positioned between the two press members 28, 29 of the heated pressing installation 26.

Figures 7, 8:
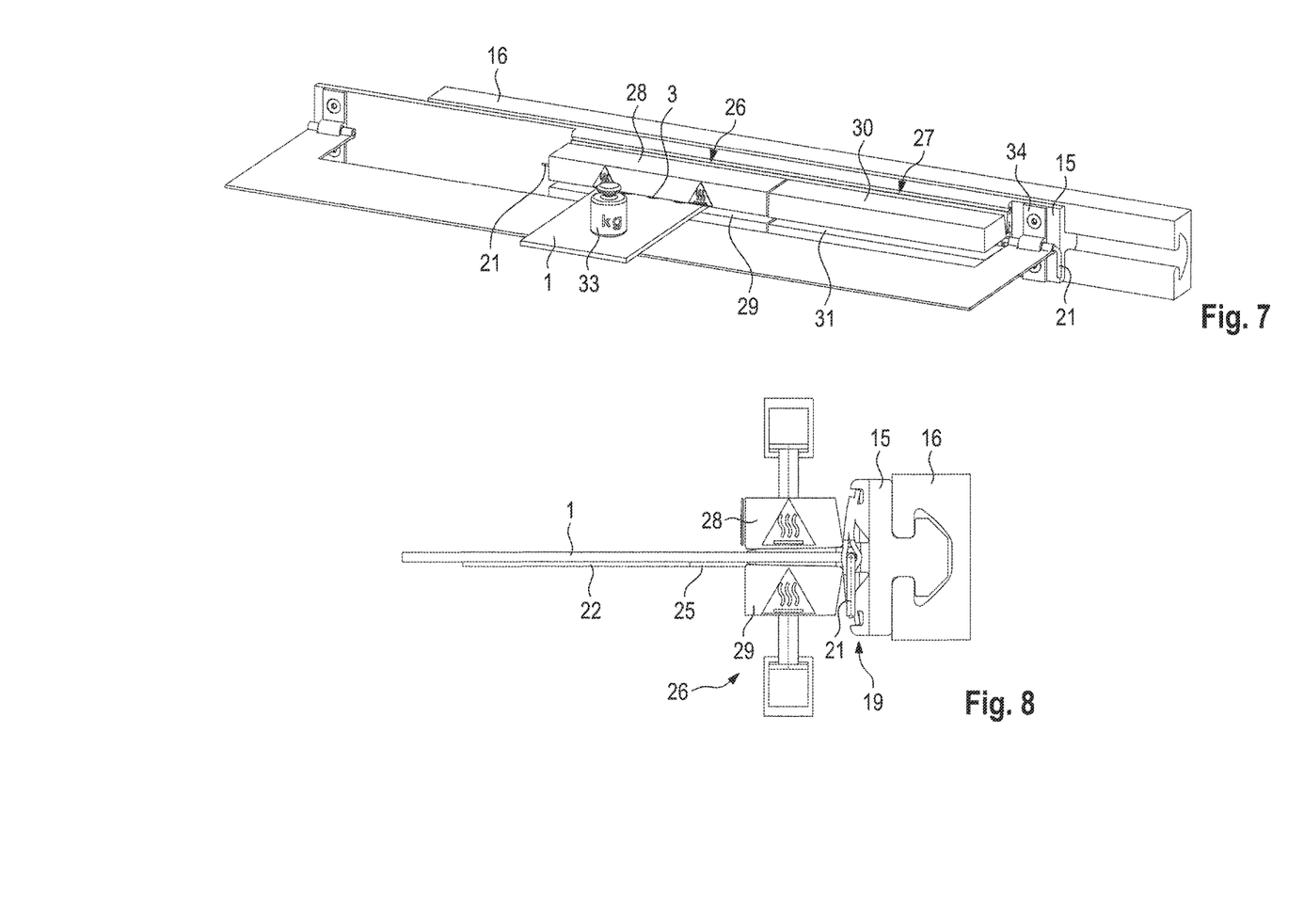
FIG. 7 shows the device according to FIG. 1, shown for a third method step for attaching the connector element to the belt end of the conveyor belt.
FIG. 8 shows the third method step, illustrated in a sectional view according to FIG. 2.

A third method step is illustrated in the context of FIGS. 7 and 8, wherein the hot press members 28, 29 of the pressing installation 26 are then converged, said press members 28, 29 thus acting on the connector element 3 and on the conveyor belt 1. The legs 32 of the connector element 3 are brought to bear on the conveyor belt 1, the connector element 3 under the effect of the pressing installation 26 in the region of the adhesive tier 6 that is formed from the thermoplastic adhesive being adhesively bonded to the conveyor belt 1. In particular, the heated pressing installation 26 acts on the connector element 3 at a temperature of up to 180° C. over a time period of 6 to 8 seconds, in order for said connector element 3 to be connected to the conveyor belt 1. The press members 28, 29 are then diverged again.

Figure 9:
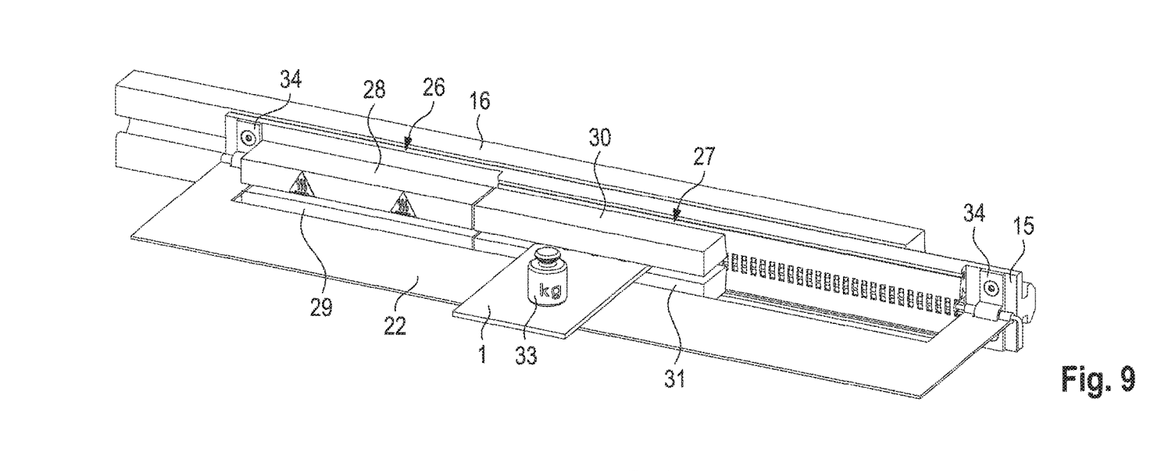
FIG. 9 shows the device according to FIG. 1, shown for a fourth method step for attaching the connector element to the belt end of the conveyor belt'
Figure 10:
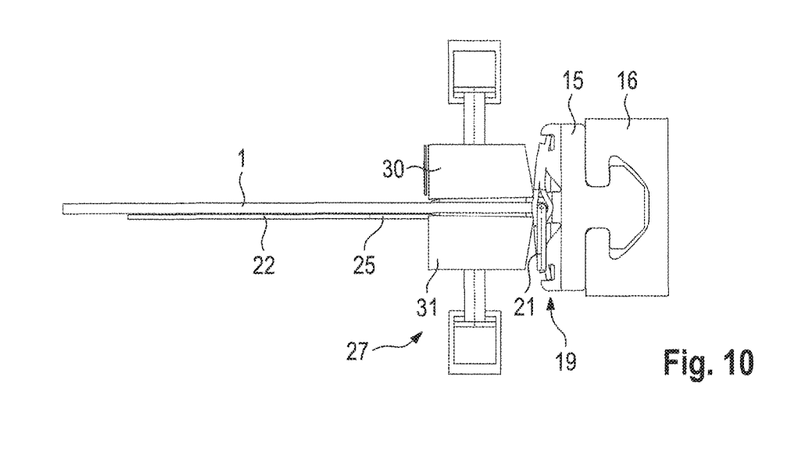
FIG. 10 shows the fourth method step, illustrated in a sectional view according to FIG. 2.

A fourth method step is illustrated in the context of FIGS. 9 and 10, wherein the rail 16 is subsequently repositioned, and the two pressing installations 26, 27 are thus repositioned, to a position according to the initial position as per FIGS. 3 and 4, the cooled press members 30, 31 of the pressing installation 27 then being converged. A post-pressing of the connection of the connector element 3 to the conveyor belt 1 is performed by means of the cooled pressing installation 27. Post-pressing is performed in particular over a time period of 1 to 2 seconds.

Figure 11:
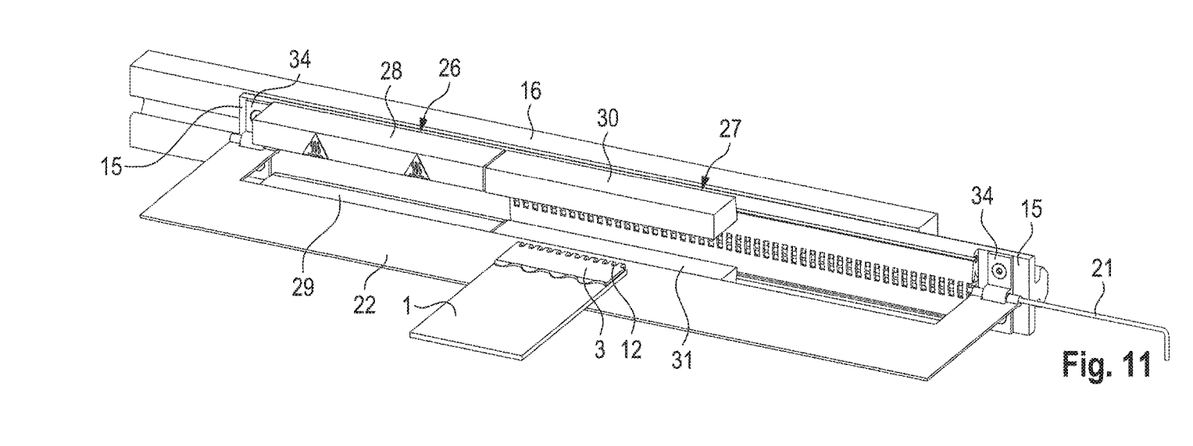
FIG. 11 shows the device according to FIG. 1, shown for a fifth method step for attaching the connector element to the belt end of the conveyor belt.
Figure 12:
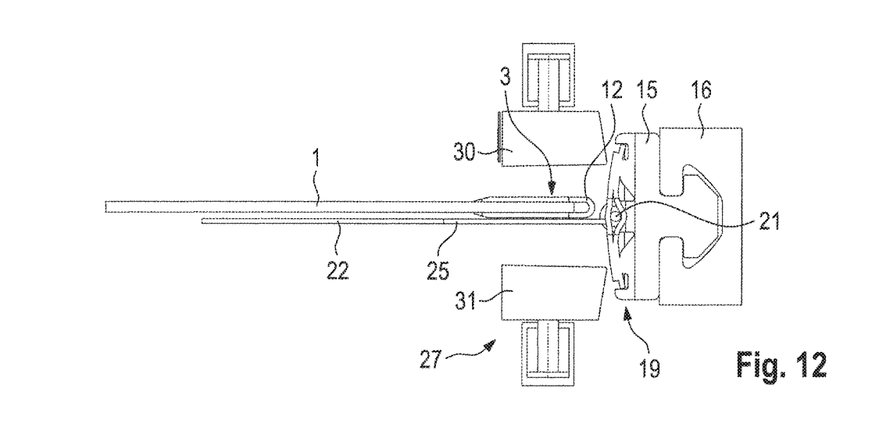
FIG. 12 shows the fifth method step, illustrated in a sectional view according to FIG. 2.
Figure 13:
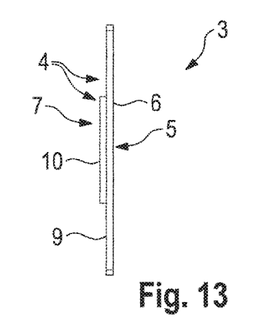
FIG. 13 shows the connector element to be attached in a planar initial state, shown in a lateral view.
Figure 14:
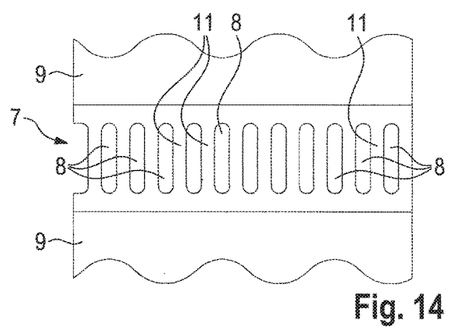
FIG. 14 shows said connector element in a plan view.

A fifth method step is illustrated in the context of FIGS. 11 and 12, wherein the press members 30, 31 are subsequently diverged again, and the fixing rod 21 is withdrawn from the positioning installation 19 such that the connector element 3 can be removed conjointly with the conveyor belt 1 from the positioning installation 19.

Attaching a further connector element to a conveyor belt is performed in a manner analogous to that described hereinabove.

That which is claimed is:

1. A method for attaching a connector element to a belt end of a conveyor belt, wherein the connector element has a base tier and an adhesive tier disposed on one side of the base tier and configured to produce adhesive under the effect of heat, the base tier in a central region being provided with passages, comprising:
   (i) disposing the connector element on the belt end, wherein the connector element is positioned in a U-shaped deflection and is disposed on averted sides of the belt and on one end side of the belt, wherein the passages are positioned in the region of the U-shaped deflection of the connector element and the adhesive tier is disposed so as to face the averted sides of said belt;
   (ii) mounting the connector element in the region of the passages in a positioning installation; and
   (iii) connecting the connector element to the belt in the region of the averted sides of the belt, wherein the connector element is adhesively bonded to the belt under the effect of a heated pressing installation that is disposed on both sides of the belt;

wherein the positioning installation is not locationally variable and the heated pressing installation is locationally variable in a linear manner, or wherein the heated pressing installation is not locationally variable and the positioning installation is locationally variable in a linear manner.

2. The method according to claim 1, wherein the connection of the connector element to the conveyor belt is post-pressed under the effect of a cooled pressing installation that is disposed on both sides of the belt.

3. The method according to claim 2, wherein the belt in the region of the belt end, in the case of a positioned connector element is secured so as to be locationally fixed in relation to the connector element until the post-pressing is completed.

4. The method according to claim 1, wherein the adhesive tier is a layer of a thermoplastic heat-melt adhesive that is applied to the base tier as an applied polyurethane layer.

5. The method according to claim 2, wherein the heated pressing installation for connecting the connector element to the belt acts on the connector element at a temperature of up to about 180° C. and over a time period of about 6 to 8 seconds, and wherein the cooled pressing installation post-presses the connection over a time period of about 1 to 2 seconds.

6. The method according to claim 1, wherein the heated pressing installation does not act on the connector element in the region of the U-shaped deflection of the connector element.

7. The method according to claim 1, wherein the connector element has the adhesive tier also in the region of the U-shaped deflection.

8. The method according to claim 1, wherein the connector element between the passages forms U-shaped protrusions that are plug-fitted through openings in the positioning installation, and wherein a rod of the positioning installation is plug-fitted perpendicularly to the plug-fitting direction of the connector element, the rod engaging behind the protrusions and securing the connector element counter to the plug-fitting direction of the protrusions.

9. The method according to claim 2, wherein the connector element that is connected to the belt is transferred in a positionally fixed manner from the heated pressing installation to the cooled pressing installation.

10. The method according to claim 1, wherein the connector element is a metal-free connector element.

11. The method according to claim 1, wherein the connector element is reinforced in the region of the U-shaped deflection by a tension member that is attached to the base tier.

12. The method according to claim 1, wherein the connector element is attached to one of a polyurethane belt, a polyvinyl chloride belt, a cotton belt, a felt belt, a belt that is composed of mixtures of the aforementioned materials, or to a filter belt.

13. A method for attaching a connector element to a belt end of a conveyor belt, wherein the connector element has a base tier provided with passages in a central region and an adhesive tier disposed on one side of the base tier that produces adhesive under the effect of heat, the method comprising:
(i) disposing the connector element on the belt end of the conveyor belt positioned in a U-shaped deflection that is disposed on averted sides of the belt and on one end side of the belt with the passages positioned in the region of the U-shaped deflection and the adhesive tier disposed so as to face the averted sides of the belt; and
(ii) attaching the connector element to the conveyor belt in the region of the averted sides of the belt by adhesively bonding the connector element to the belt under the effect of a heated pressing installation on both sides of the belt, wherein the belt end of the conveyor belt is horizontally disposed when the connector element is being attached to the belt.

14. The method according to claim 13, wherein the attachment of the connector element to the conveyor belt is post-pressed under the effect of a cooled pressing installation that is disposed on both sides of the belt.

15. A method for attaching a connector element to a belt end of a conveyor belt, wherein the connector element is a metal-free connector element that has a base tier provided with passages in a central region and an adhesive tier disposed on one side of the base tier that produces adhesive under the effect of heat, the method comprising:
(i) disposing the metal-free connector element on the belt end of the conveyor belt positioned in a U-shaped deflection that is disposed on averted sides of the belt and on one end side of the belt with the passages positioned in the region of the U-shaped deflection and the adhesive tier disposed so as to face the averted sides of the belt; and
(ii) attaching the metal-free connector element to the conveyor belt in the region of the averted sides of the belt by adhesively bonding the connector element to the belt under the effect of a heated pressing installation on both sides of the belt.

16. The method according to claim 15, wherein the attachment of the metal-free connector element to the conveyor belt is post-pressed under the effect of a cooled pressing installation that is disposed on both sides of the belt.

17. The method according to claim 16, wherein the conveyor belt in the region of the belt end is secured so as to be locationally fixed in relation to the metal-free connector element until the post-pressing is completed.

18. The method according to claim 15, wherein the heated pressing installation does not act on the metal-free connector element in the region of the U-shaped deflection.

19. The method according to claim 15, wherein the metal-free connector element has the adhesive tier also in the region of the U-shaped deflection.

20. The method according to claim 15, wherein the metal-free connector element between the passages forms U-shaped protrusions that are plug-fitted through openings in the positioning installation, and wherein a rod of the positioning installation is plug-fitted perpendicularly to the plug-fitting direction of the metal-free connector element and engages behind the protrusions and secures the metal-free connector element counter to the plug-fitting direction of the protrusions.

* * * * *